NON-DESTRUCTIVE READOUT SYSTEM

Filed Sept. 30, 1957 4 Sheets-Sheet 1

INVENTOR.
JAMES W. CROWE

BY George Baron
ATTORNEY

June 18, 1963 J. W. CROWE 3,094,685

NON-DESTRUCTIVE READOUT SYSTEM

Filed Sept. 30, 1957 4 Sheets-Sheet 2

June 18, 1963 J. W. CROWE 3,094,685

NON-DESTRUCTIVE READOUT SYSTEM

Filed Sept. 30, 1957 4 Sheets-Sheet 3

June 18, 1963 J. W. CROWE 3,094,685

NON-DESTRUCTIVE READOUT SYSTEM

Filed Sept. 30, 1957 4 Sheets-Sheet 4

United States Patent Office 3,094,685
Patented June 18, 1963

3,094,685

NON-DESTRUCTIVE READOUT SYSTEM

James W. Crowe, Hyde Park, N.Y., assignor to International Business Machines Corporation, New York, N.Y., a corporation of New York Filed Sept. 30, 1957, Ser. No. 686,924
7 Claims. (Cl. 340—173.1)

This invention relates to storage memory devices employing superconductive elements, and more particularly to a method and means for non-destructively sensing the information in such memory devices.

The memory device is composed of a thin layer of material in the superconductive state in which persistent currents may be established therein and controlled for memory and logical purposes. As a memory device, the persistent currents may be established in either of two directions, one direction being designated as the storage of a binary "1" and the other direction the storage of a binary "0." Alternatively, currents in the same direction but having different amplitudes may be designated as a binary "1" or a binary "0." In the instant invention, the presence of a persistent current will represent the storage of a binary "1" and the absence of a persistent current represents the storage of a binary "0."

It is a very desirable feature in the operation of computers employing binary logic to read the information residing in a memory cell and transfer such information to a utilization circuit in such computer without destroying the information readout of such memory cell. Such operation, commonly referred to as non-destructive readout, requires circuitry that is consonant with the type of bistable device being employed as the memory or storage unit. This invention treats of a novel method and means for obtaining non-destructive readout of a memory device employing superconductive elements.

A treatise on superconductivity, or the disappearance of resistance to electrical current in a substance at temperatures near absolute zero, is the text entitled "Superconductivity" by D. Shoenberg published in 1952 by the Cambridge University Press in London, England. Such treatise is a detailed analysis of superconductivity and the reader is advised to consult same for a comprehensive treatment of the subject of superconductivity. The instant disclosure will treat only so much of the theory of superconductors that will enable the skilled person in the art to duplicate the invention hereinafter described.

The invention relates to a cell composed of a thin material in the superconductive state in which a persistent current is established therein to designate the storage of a binary "1." Associated with such thin material are three separate control or drive windings and a sensing circuit. The control or drive windings are each adapted to carry unipolar, equal amplitude pulses simultaneously in order to alter or otherwise affect the persistent current in the superconductive memory cell. For writing binary information into the memory cell, all three unipolar, substantially equal amplitude pulses are applied simultaneously to their respective drive windings with this distinction. For a write "0" instruction, all drive pulses are applied simultaneously. For a write "1" instruction, the third drive pulse is delayed and is not applied until the first two simultaneous pulses have terminated or dropped below a predetermined value. For a read instruction, two drive pulses are applied simultaneously, regardless of the state of the superconductive memory cell. The output or sensing circuit is gated so as to carry a usable output pulse only during the read operation, and such read operation produces a usable pulse only when the bistable superconductive element is in its "0" state at the time of reading. Consequently the present invention is oriented to transfer "0's" instead of "1's." A memory buffer register that is adapted to receive information from a memory cell of this invention is initially set by having all the cells of the memory buffer register set to their respective "1" states (persistent currents circulating in their respective superconductor elements), and a transfer takes place from the memory to the memory buffer only when a "0" is read out of memory.

Accordingly, it is an object to attain a non-destructive readout system for memory cells employing superconductive elements.

It is another object to attain a novel read-write method and means for a superconductive memory cell.

It is yet another object to provide improved means for operating a superconductive memory cell so as to simplify the application of such memory cells toward the solution of logic.

Other objects of the invention will be pointed out in the following description and claims and illustrated in the accompanying drawings which disclose, by way of example, the principles of the invention and the best modes which have been contemplated of applying those principles.

Figure 1:
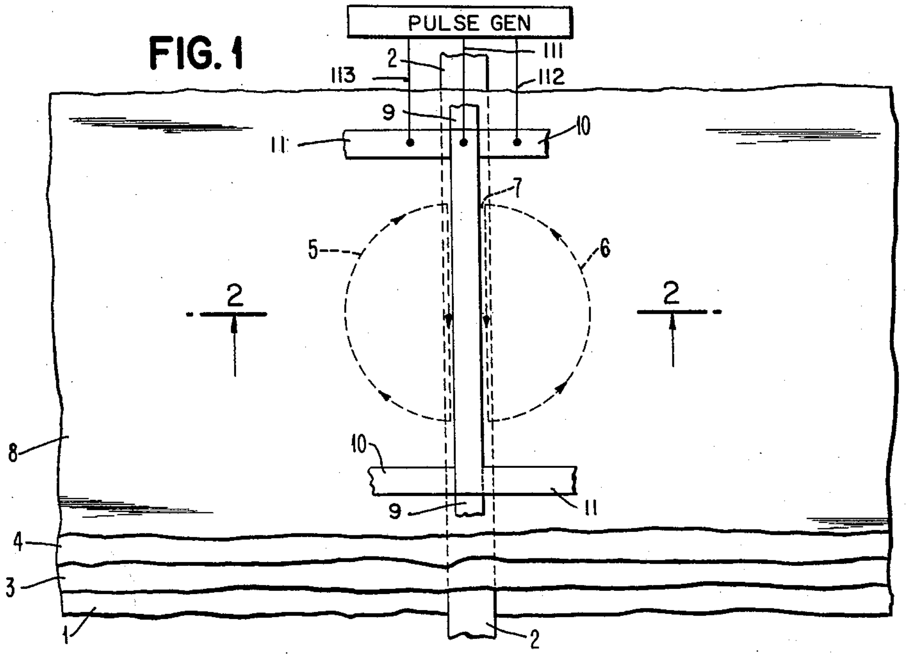
FIG. 1 illustrates a superconductive memory cell with its associated drive windings.
Figure 2:
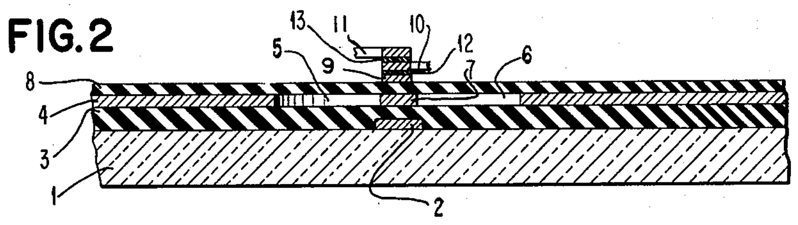
FIG. 2 is a cross-section of the memory cell of FIG. 1 taken along the line 2—2 of FIG. 1.
Figure 9:
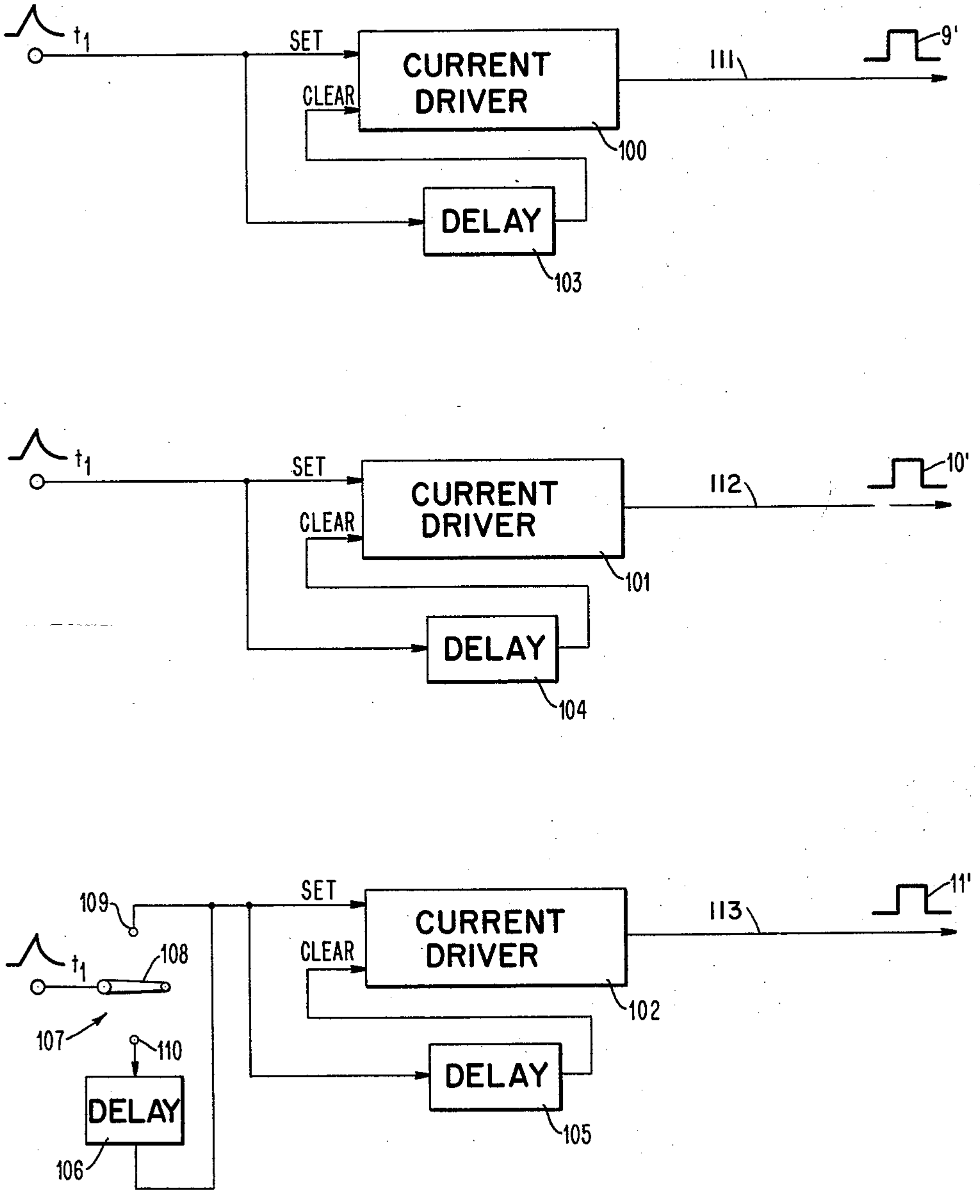
FIG. 9 is a schematic showing, in block form, of pulse generation equipment that could be employed in the practice of the present invention.

The basic memory cell of this invention is similar to the type disclosed in my copending applications entitled "Electrical Apparatus," Serial No. 615,830, filed on October 15, 1956, and "Superconductive Devices," Serial No. 680,456, filed August 27, 1957. The operation of the memory cell is described in greater detail in the latter two applications, but sufficient description of such memory cell is being given herein in order to better understand the operation of my non-destructive readout system. FIG. 1 shows a substratum 1 of glass, or similar non-conductor of electricity but a relatively good conductor of heat, on which is deposited by vacuum deposition or printed circuit technique a superconductive layer or sense winding 2 over which is placed an insulating layer 3 composed of silicon monoxide, crystalline aluminum oxide, or pyroceram, a product manufactured by that trade name by the Corning Glass Corporation. Another superconductive layer 4 is deposited over the insulating base 3 and apertures 5 and 6 are masked out in this layer 4 save for a thin section 7, such thin section hereinafter referred to as the cross bar. Another electrical insulator but good heat conductor, layer 8, is deposited over the superconductor layer 4 and a drive wire 9 is deposited or otherwise placed over the insulated layer 8 in the vicinity of cross bar 7. Two other drive wires 10 and 11 are placed over drive wire 9 (shown more clearly in FIG. 2), such drive wires being separated from one another by insulated layers 12 and 13. A pulse generator shown in block form is connected via conductors 111, 112 and 113 to their respective drive lines 9, 10 and 11. Such pulse generator generates the pattern of pulses shown in FIGURES *4a*, *4b* and *4c* needed to practice the invention. A specific pulse generator for carrying out the invention is shown in FIGURE 9 of the drawings.

By definition, a circulating current persisting in cross bar 7, as shown by arrows in FIG. 1, represents the storage of a binary "1." The absence of such circulating current in cross bar 7 indicates the storage of a binary "0." Moreover, the present system is designed to produce a usable output signal across sense winding 2 when the superconductive storage element is in its "0" state and a read pulse is applied to the drive windings to nondestructively readout such "0"; at all other times that the memory cell is actuated no usable output pulse is obtained across sense winding 2.

Figure 3:
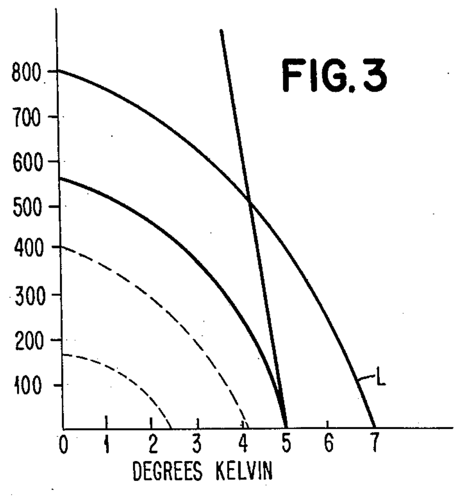
FIG. 3 is a diagram of critical field versus absolute temperature of a series of superconductive elements.

Attention is now directed to FIG. 3 wherein is shown a plot of field strength in oersteds versus temperature in degrees Kelvin that provides a picture of the behavior of the superconductive characteristic of certain materials. The area to the right of a curve, such as the plot of curve L for an alloy of lead, represents the region of normal resistance for such lead alloy. That is, a point anywhere to the right of curve L indicates that the lead alloy will behave as a resistive element to current flow therethrough whereas a point to the left of curve L will indicate that the lead alloy will behave as a superconductor when current less than its critical current flows therethrough. For the particular lead alloy chosen, the curve L intersects the X-axis at about 7.2° K., indicating that for a zero magnetic field applied to such lead alloy, the latter behaves as a normal resistive element for temperatures greater than 7.2° K., and behaves as a superconductive element for temperatures less than 7.2° K. If for any reason the temperature of the lead alloy represented by curve L is made to exceed 7.2° K., the lead alloy will be normally resistive. The time that it takes to cool the lead alloy from its resistive temperature to its superconductive temperature is called its "relaxation time." Such relaxation time is important in the practice of the instant invention and the shorter one can make this relaxation time, the greater will be the speed of read-out and read-in of the instant memory cell.

In order to actuate the memory cell shown in FIG. 1, unipolar pulses of the same amplitude are applied in various combinations to the drive windings 9, 10 and 11. The pulses appearing on drive windings 9 and 10 appear coincidently. The pulse appearing on drive winding 11 appears sometimes coincidently with the pulses on windings 9 and 10 and sometimes appears a predetermined interval thereafter. It is the nature in which these pulses are made to appear on their respective drive windings 9, 10 and 11 that permit non-destructive readout of information stored in the memory cell.

Figure 5:
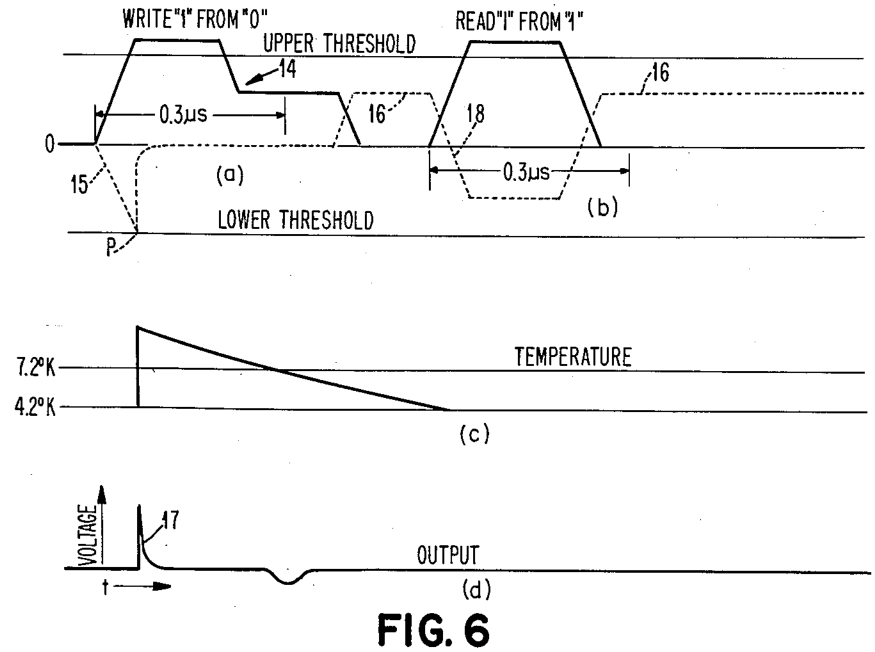
FIGS. 5–8 are pulse diagram representations of the changes taking place in the memory cell during writing and reading steps.

Turning to FIG. 5, there is shown how one employs the present invention to write a "1" into a memory cell that is in the "0" state, and how one reads out such a "1." In the waveforms of FIG. 5 it is desired to write a "1" in a memory cell by the coincidence of pulses appearing on the drive windings 9, 10, followed by a pulse on winding 11 immediately upon termination of such coincident pulses to give a composite waveform 14 termed write "1." The amplitude of this composite waveform 14 is such that it rises above the upper threshold level of superconductive cross bar 7 to a small degree, said threshold level being the level at which a super-conductor becomes normally conducting or resistive and causes a sharp rise in temperature of the cross bar 7. Pulse 14, after it has performed its function of driving cross bar 7 resistive, is lowered in amplitude, and this lower amplitude pulse remains on long enough for the temperature of the cross bar 7 to drop low enough that it will sustain a current of this low amplitude current pulse without going normal conducting. This requires that a time, measured from the beginning of the pulse 14 to some time during the period of the lower amplitude portion of the pulse 14, be no less than 0.3 microsecond in the illustration given, or no less than the heat relaxation time of the cross bar 7.

Considering the case when a "0" exists (no circulating currents in superconductive cross bar 7) in a selected memory cell, the induced circulating current in cross bar 7 will build up initially in such direction as to oppose any flux changes in the holes 5 and 6 of the cell. At some critical value of circulating current 15 (lower threshold or point P) in the cross bar 7, the latter goes normal conducting. The circulating current 15 then dies out very rapidly, allowing the magnetic field created by the currents in drive windings 9 and 10 to penetrate the cross bar 7. The rapidly decaying current in the resistive cross bar and the changing magnetic field cause energy to be dissipated as heat in the cross bar 7, raising the latter's temperature as shown in FIG. *5c*. The resultant temperature rise goes above the critical temperature of the cross bar material (shown as 7.2° K. in FIG. 3) making it completely normal conducting. After the circulating current has decayed to zero and the field of drive windings 9 and 10 has completely penetrated the cross bar 7, the temperature begins to fall as is seen in FIG. *5c*. There is a time period in which the temperature of the cross bar 7, though falling, is still above the critical temperature of the cross bar material. After the temperature has dropped below the critical temperature of the cross bar material, the cross bar 7 material becomes super-conducting and the maximum current carrying capacity of such bar 7 is a function of the difference between the temperature below the critical temperature of the cross bar 7 and its actual temperature as described by Shoenberg on pages 174 to 178 of his text on "Superconductivity," published in 1952 by Cambridge University Press. In effect, there are different current-carrying capacities even in the superconductive region and these current-carrying capacities are a function of the difference between the critical temperature of cross bar 7 and the actual temperature in the super-conductive region of the cross bar 7. If, however, the composite drive currents at the selected memory cell are reduced by approximately half before the temperature of the cross bar 7 has dropped appreciably below its critical temperature, some of the flux which penetrated the cross bar 7 initially comes back out. Since the dissipation of energy in the cross bar 7 is not as rapid as it was initially because the time rate of change of the field now depends solely on the fall time of the composite current waveform 14, the cross bar 7 does not heat up appreciably. If the drive current, and hence magnetic field, is held constant for a time which is long enough for the temperature of the cross bar 7 to decrease below its critical temperature to a degree sufficient to support a circulating current 16 therein which will allow the lowered value of field to remain trapped in the cell, and then the drive current is decreased to zero, a trapped flux will remain. This trapped flux is supported by a current 16 which circulates in the cell and is constant as long as the cross bar 7 is superconducting. The presence of the trapped field in a cell defines the "1" state and indicates the writing of a "1" in the memory cell shown in FIG. 1. It is noted that a sharp output pulse 17 (see FIG. *5d*) is produced in sense winding 2 when the cross bar 7 of the superconductive memory cell is driven resistive by the simultaneous application of unipolar and nearly equal amplitude pulses to drive windings 9 and 10, but this output pulse is not carried by the output circuit associated with sense winding 2. This is easily done by having the output pulses appearing on sense winding 2 sent through a gate to its associated output circuit, and such gate could be always kept closed during the writing cycle of the memory cell.

Figure 4A:
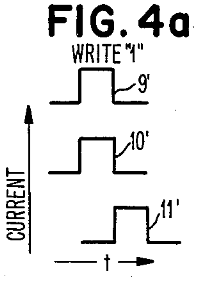
FIG. 4 is a timing diagram of pulses applied to the superconductive memory cell during writing and reading operations.

The composite waveform 14 for write "1" instruction will consist of three unipolar, nearly equal amplitude pulses shown as pulses 9', 10' and 11' in FIG. 4*a*. Although pulse 9' is applied to drive winding 9 at the same time that pulse 10' is applied to drive winding 10, pulse 11' is sent through a delay network so that it does not appear on drive winding 11 until pulses 9' and 10' terminate. The delay network is gated in only during a write "1" instruction.

In order to read the "1" stored as a circulating current 16 in cross bar 7, a combination of pulses 9' and 10' (see FIG. 4*c*) is applied to drive windings 9 and 10 respectively. The presence of persistent superconductive current 16, as is shown in 5*b*, prevents the current 18 induced in the cross bar 7 from reaching its critical current, because the induced current 18 is never high enough to overcome the bias of the persistent current 16. The read pulses 9' and 10' terminate without the superconducting cross bar 7 going normal, so there is no change in the value of the trapped flux in holes 5 and 6 of the memory cell. Since there is no change in the status of the memory cell of FIG. 1 when the latter is interrogated or read out, no output pulse appears on sense winding 2 of the memory cell. The absence of an output pulse on sense winding 2 during a read instruction indicates the presence of a "1" in the memory cell, for the gate coupling the sense winding 2 to its associated output circuit is always open during the read step.

Figure 6:
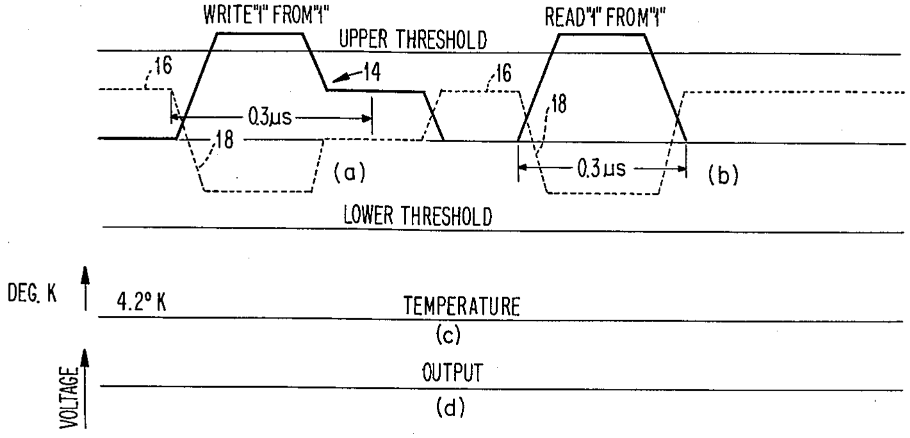

FIG. 6*a* is a pulse-current representation of how one employs the teaching of the present invention in writing a "1" in my memory cell when the latter already is in its "1" state. The composite waveshape 14 comprising pulses 9', 10' and 11' is applied as shown in FIG. 4*a* to their respective drive windings 9, 10 and 11. Since the biasing action of persistent circulating current 16 prevents the induced circulating current 18 from reaching the threshold or critical current of cross bar 7, the latter does not go normal conducting and no change in the flux trapped in the vicinity of holes 5 and 6 takes place. Upon termination of the composite waveform 14, the memory cell relaxes to its initial persistent circulating current, and the "1" state remains after a write "1" instruction is completed. FIG. 6*b* is similar to FIG. 5*b* and indicates that no output pulse appears when a "1" is read, regardless of the state of the memory cell at the time prior to the writing of such "1" into the memory cell.

Figure 4B:
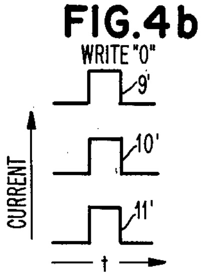
Figure 4C:
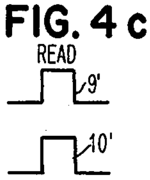
Figure 7:
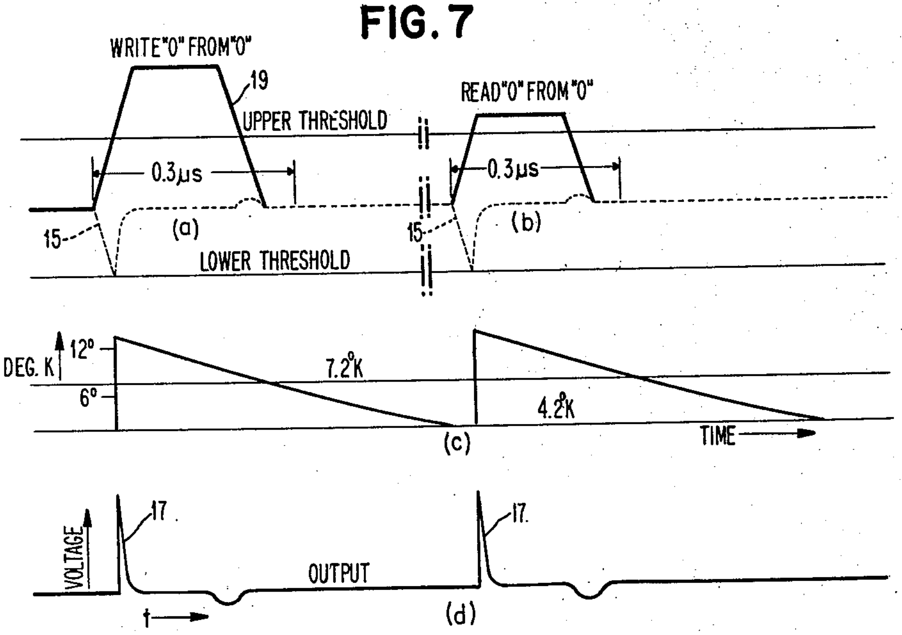
Figure 8:
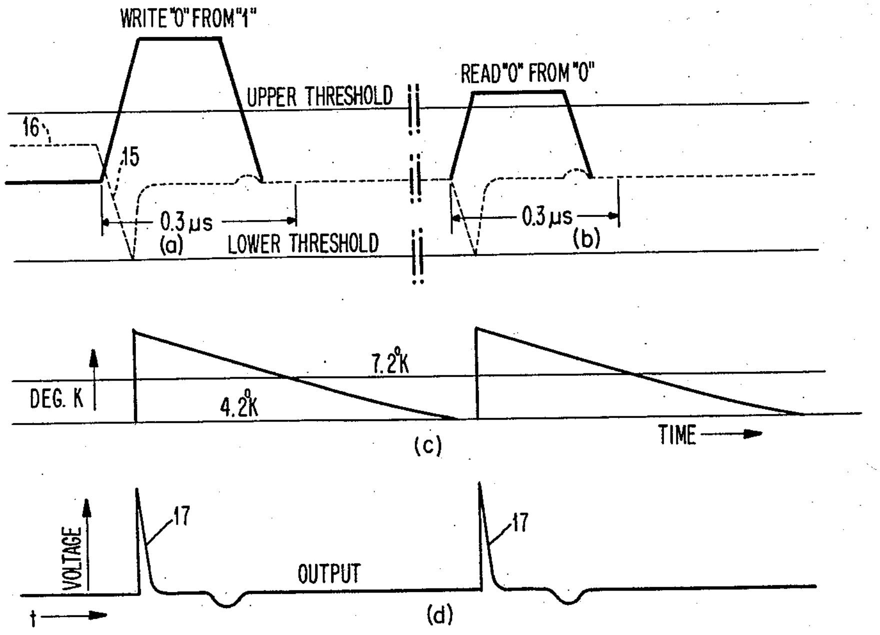

FIG. 7*a* depicts the manner of writing a "0" into a selected memory cell of a memory array of superconductive cells, wherein the selected memory cell is already in its "0" state (no persistent circulating current). Three unipolar, nearly equal amplitude pulses 9', 10' and 11' as shown in FIG. 4*a* are applied simultaneously to their respective drive windings 9, 10 and 11 to produce the composite waveform 19 of FIG. 7*a*. Such composite waveform is sufficient to cause the induced circulating current 15 in the cross bar 7 to exceed its critical current and go normal conducting. As was previously described in the case of a command to write a "1" from a "0," when the bar 7 goes normal conducting, the induced current collapses and the applied field created only by the currents in drive windings 9, 10, bursts through the plane of the cross bar 7 causing a temperature rise of the cross bar as shown in FIG. 5*c*. Now, if it is desired to write a "0," the three coincident pulses 9', 10' and 11', as shown in FIG. 4*b* and illustrated in FIGS. 7 and 8, are terminated before the temperature of the bar 7 has dropped below its critical temperature (in the example shown, 7.2° K.), causing the magnetic field which had burst through the cross bar 7 to collapse. Since the rate of decay of the magnetic field with respect to time is slow compared to its rate of buildup, no further significant temperature rise takes place, and no magnetic flux will be trapped when the cross bar 7 temperature drops to the final value of its environment, or about 4.2° K. Since no magnetic flux remains, the cell contains no circulating persistent current and is in its "0" state. Again it is noted that the output pulse 17 of FIG. 7*d* is not effective since an output circuit coupled to the sense winding 2 is not operative during the write cycle.

FIG. 7*b* indicates that a "0" is read out by applying the two pulses 9' and 10' simultaneously to their corresponding drive windings 9 and 10. Since the memory cell in its "0" state contains no persistent circulating current, the circulating current 15 will not be impeded in its buildup (as would be the case if the memory cell were in its "1" state), causing the critical field of the superconductive cross bar 7 to be reached, driving the latter into its normal conducting state and its consequent rise in temperature. Again the simultaneous read pulses 9' and 10' are turned off before the temperature has decayed to its critical temperature of 7.2° K. and the magnetic field of the drive windings 9 and 10, which burst through when the bar 7 became normally conductive, now collapses, leaving no persistent circulating current in cross bar 7. The output pulse 17 that resulted during the reading of a "0" signifies the presence of a "0" in the memory cell, and such output pulse is utilized by the output circuit coupled to sense winding 2. It is also noted that not only is a "0" read out of the memory cell, but the "0" is still retained in the cell, resulting in non-destructive readout of information.

The last example of a "write" operation is shown in FIG. 8*a* wherein a "0" is written into my memory cell when the latter is in its "1" state. To write a "0," the write "0" pulse, as shown in FIG. 4*b*, will comprise the simultaneous combination of pulses 9', 10' and 11' to produce the composite waveform 19. Such composite waveform 19 is sufficient to cause the induced current 15 to reach the lower threshold of cross bar 7, at which time the latter becomes normal conducting and heats up. The composite waveform 19 is terminated in a time less than the heat relaxation time of cross bar 7, so there is no trapped flux in the memory cell of FIG. 1, and the latter is in its "0" state. The readout of a "0" from a "0" of FIG. 8*b* is identical with that of FIG. 7*b*. Since the "0's" are transferred, the memory cells in a memory buffer would be cleared to their "1" states, awaiting receipt of "0's" from the memory storage. Obviously one may change the convention used herein and call the presence of persistent circulating currents a "0," and its absence a "1," and modify the logic to conform to such change.

It is to be understood that the memory cell shown in FIG. 1 will be arranged in a two dimensional matrix, or a plurality of two dimensional arrays can be incorporated into a three dimensional memory arrangement. Moreover, the drive windings 9, 10 and 11 need not be superimposed as shown in FIG. 1 but may be arranged adjacent each other, in the vicinity of cross bar 7. It is also seen that drive windings 9, 10 and 11 are energized with current pulses which individually create magnetic fields that are less than the critical field of the superconductive cross bar 7, but the combination of any two or three pulses at a selected coordinate intersection may be such as to exceed the critical field, provided the fields are in aiding relationship. The practice of the instant invention is particularly advantageous in that it relies on unipolar pulses for its read and write steps, whereas many memory systems require different polarity pulses for the separate commands, "read" and "write."

The memory cell has been shown as having holes 5 and 6 about which persistent circulating currents are made to flow when flux is trapped in said holes, such persistent current flowing in the superconductive layer 4 and cross bar 7 in the manner shown by the arrows in FIG. 1. Such holes are not necessary and could be replaced by areas of impurity, wherein the impurity in an otherwise pure substance will act as nuclei for trapping magnetic flux so that superconductive flow can be maintained about the impurity. The holes are preferred to impurities, in some instances, because the trapping of flux is more predictable as to location.

An exemplary though nowise limiting set of values would be 800 angstroms thick for the superconductor layer 4 and drive windings 9, 10 and 11 and about 1500 angstroms thick for the sense winding 2. The insulating layers 3, 8, 12 and 13 could be of the order of 1000–2000 angstroms thick depending upon the material selected. The holes 5 and 6, when joined, would have a diameter of about 0.1 inch and the width of cross bar 7 would be about 7 mils. If the threshold of the superconductor occurs at 0.3 ampere drive current, the heat relaxation time is about 0.5 microsecond. If the drive current is 1.0 ampere, the heat relaxation time was about 1.25 microseconds. For a 3 ampere drive current, the heat relaxation time was about 3.5 microseconds. An output voltage pulse of 5 millivolts appeared across sense winding 2 when a memory cell of a particular geometry was driven from its superconductive state to its normal state with only 0.009 ampere of drive current being applied to drive windings 9, 10 and 11.

FIG. 9 is a block form illustration of a representative pulse generator one may employ to obtain the sequence of pulses shown in FIGS. *4a*, *4b*, and *4c* of the drawings. The pulse generator would comprise three current generators 100, 101 and 102, each of a type known as a monostable multivibrator. With each current driver is associated a delay circuit, such as delay circuit 103, 104 or 105. The current driver that generates pulse 11' has associated therewith a switch 107. The switch has an arm 108 which can make contact with contacts 109 and 110. When it is desired to generate simultaneous pulses 9' and 10' (see FIG. *4c*), then only current drivers 100 and 101 are actuated. The delay circuits 103 and 104 terminate the pulses 9' and 10'. When it is desired to obtain the simultaneous occurrence of pulses 9', 10' and 11', as shown in FIG. *4b*, then arm 108 makes contact with contact 109 at time $t_1$. If one desires to obtain the configuration of pulses in FIG. *4a*, then switch arm 108 makes contact with contact 110 and delay circuit 106 permits the generation of pulse 11' to take place upon termination of coincident pulses 9' and 10'. The current drivers and delay circuits of FIG. 9 are conventional electronic equipment and it is not necessary to define them further, in that such equipment can be modified to suit the operating parameters of the present invention.

The instant invention has obtained non-destructive read-out of binary information when such information is stored in the manner consonant with the characteristics of super-conductors and related memory devices. It will be understood that various omissions and substitutions and changes in the form and details of the devices illustrated and in their operation may be made by those skilled in the art without departing from the spirit of the invention. It is the intention, therefore, to be limited only as indicated by the scope of the following claims.

What is claimed is:

1. A means for writing binary information in a superconductive memory cell wherein the presence of persistent currents unsupported by a source of electrical potential in said superconductive memory cell indicates the storage of a binary bit representative of a first polarity and the absence of persistent currents represents the storage of a binary bit of a second polarity, comprising means for creating three separate magnetic fields each of which is of the same polarity and magnitude as the others, said fields being applied to said superconductive memory cell so as to affect its storage state, means for applying two of said magnetic fields coincidently and the third field immediately upon termination of said coincident fields.

2. Means for writing binary information in a superconductive memory cell having a predetermined heat relaxation time and wherein the presence of persistent currents in said superconductive memory cell indicates the storage of a binary bit of a first polarity and the absence of persistent currents indicates the storage of a binary bit of a second polarity comprising means for creating three separate magnetic fields each of which is of the same polarity and magnitude as the other, said fields being applied to said superconductive memory cell so as to affect its state, means for applying two of said magnetic fields coincidently to said memory cell so as to drive said cell towards its normal conductive state, means for terminating said coincident magnetic fields at a time less than said heat relaxation time, and means for applying said third magnetic field to said superconductive cell at the time when said two magnetic fields have terminated, said third magnetic field persisting for a time sufficiently beyond said heat relaxation time to trap magnetic flux in said memory cell.

3. Means for writing a binary "1" in a superconductive memory cell having a predetermined heat relaxation time and wherein the presence of a persistent current in said superconductive memory cell indicates the storage of a binary "1" and the absence of a persistent current indicates the storage of a binary "0" including means for applying a first magnetic field to said superconductive cell of sufficient magnitude to be effective to cause said cell to be driven to its normally conductive state in the absence of a persistent circulating current in said cell but ineffective to be driven to its normally conductive state in the presence of a persistent circulating current in said cell, means for terminating said first magnetic field at a time less than the heat relaxation time of said cell, and means for applying a second magnetic field that is less than the intensity of the first magnetic field to said cell immediately upon the expiration of said first magnetic field, said second magnetic field subsisting for a time sufficiently after said heat relaxation time so as to permit the trapping of flux and maintenance of a persistent circulating current in said memory cell.

4. Means for interrogating the binary state of a superconductive memory cell having a predetermined heat relaxation time and wherein the presence of a persistent current in said cell indicates the storage of a binary "1" and the absence of a persistent current indicates the storage of a binary "0" including means for applying a magnetic field to said superconductive cell of sufficient magnitude to drive the latter to become normally conductive were it in its "0" state at the time of application of said magnetic field but ineffective to drive said cell normally conductive were it in its "1" state at the time of application of said magnetic field, and means for terminating said applied magnetic field at a time that is less than said heat relaxation time.

5. The device of claim 4 which includes means for sensing the change of state of said superconductive cell in going from its superconductive state to its normal state during the application of said magnetic field.

6. Means for non-destructively interrogating the binary state of a superconductive memory cell having a predetermined heat relaxation time and wherein the presence of a persistent current in said cell represents the storage of a first binary state and the absence of a persistent current represents the storage of its second binary state, comprising means for applying a magnetic field to said superconductive cell of sufficient magnitude to drive the latter to its resistive state when it is in its second binary state but of insufficient magnitude to drive said superconductive cell to its resistive state when it is in its first binary state, means for terminating said applied field at a time that is less than said heat relaxation time.

7. A non-destructive interrogating circuit as defined in claim 6 including means for sensing the transition of said superconductive memory cell from its superconductive state to its resistive state.

References Cited in the file of this patent

UNITED STATES PATENTS

| | | |
|---|---|---|
| 2,832,897 | Buck | Apr. 29, 1958 |
| 2,877,448 | Nyberg | Mar. 10, 1959 |
| 2,888,201 | Housman | May 26, 1959 |
| 2,913,881 | Garwin | Nov. 24, 1959 |

OTHER REFERENCES

"The Cryotron, a Superconductive Computer Component" (Buck), Proc. of the IRE, vol. 44, Issue 4, pp. 482–493, April 1956.

"An Analysis of the Operation of a Persistent-Super Current Memory Cell" (Garwin), IBM Journal, October 1957, effective date, June 1, 1957.

"Superconductivity," by C. W. Hewlett, General Electric Review, vol. 49, No. 6, June 1946, pp. 19–25.